Patented Mar. 1, 1932

1,847,601

UNITED STATES PATENT OFFICE

ROBERT A. DUNHAM, OF LONG BEACH, AND MARCELLUS T. FLAXMAN, OF LOS ANGELES, CALIFORNIA, ASSIGNORS TO UNION OIL COMPANY OF CALIFORNIA, OF LOS ANGELES, CALIFORNIA, A CORPORATION OF CALIFORNIA

RECLAIMING RUBBER

No Drawing.    Application filed April 24, 1931.    Serial No. 532,702.

This invention relates to the reclamation of vulcanized rubber goods and to the reclaimed product.

Primarily the object of the invention is to develop a convenient and efficient method for reclaiming vulcanized or scrap rubber and to obtain a reclaimed rubber of high quality and desirable characteristics. The product of the present process will be superior to many reclaimed rubbers and will possess characteristics closely approximating those of the original rubber or rubber mixture used in making the goods from which the reclaimed rubber is obtained. One of us has discovered (see Serial Number 313,180) that vulcanized rubber can be softened and devulcanized by digestion and solution in a class of agents including those which are obtainable as fractions of petroleum and are soluble in liquid sulfur dioxide. Such fractions contain complex nitrogen and sulfur bodies and aromatic hydrocarbons and unsaturated hydrocarbons. Suitable agents are found as sludge oils obtained by the hydrolysis of acid sludges resulting from treating petroleum distillates, and as petroleum extracts known as Edeleanu extracts. Edeleanu extracts are by-products obtained in the refining of petroleum distillates (e. g. kerosene) by extraction with liquid sulfur dioxide. This process is commonly known as the Edeleanu process. By it the above mentioned complex nitrogen and sulfur bodies and aromatic and unsaturated hydrocarbons are removed from the oil in the liquid sulfur dioxide. The sulfur dioxide is then removed by evaporation leaving behind a liquid containing the complex substances above mentioned and constituting the Edeleanu extract. The sludge oil above mentioned and other equivalents for the extract will be more fully described hereinafter. These extracts, oils and equivalents will be herein known as the "reclaiming agents".

45    The particular feature of the present discovery is the fact that devulcanization by the agents described may be accomplished by employing a relatively small quantity of the Edeleanu extract or other agent, so that, in conjunction with a suitably high temperature hereinafter described, the devulcanization is accompanied only by a softening of the rubber mass as distinguished from solution of the rubber in the agent. By devulcanization we mean the softening of the mass with only a partial loss of coherence so that the mass can be reduced by mechanical working to a form in which it can be readily washed, dried, and sheeted or moulded.

Along with the small quantity of Edeleanu extract or other described agent, it is preferable to employ an aqueous solution in which the rubber is agitated. Where cords and other cellulose fiber are present, the solution should contain caustic alkali to accomplish the destruction of the fiber so that the reclaimed rubber will contain only the pigments and fillers which the unvulcanized rubber originally contained and so that it may be readily milled and subsequently moulded without interference from the cellulose fiber which otherwise would be present. The reclaiming of the rubber with the Edeleanu extract or other described agent, while preferably being accomplished in the presence of a solution, may however proceed in an inert atmosphere such as steam and without any aqueous solution. In the latter instance it is possible to satisfactorily devulcanize old rubber, especially where no fabric is present as for example inner tubes for automobile tires, simply by masticating the mass in any mechanical rubber working device such as a blade type mixer or the like, the temperature of course being maintained sufficiently high to accomplish devulcanization and reclamation by the reclaiming agent.

Therefore the present invention may be stated as comprising the treatment of vulcanized rubber with Edeleanu extract or other sulfur dioxide-soluble agent or agent containing such bodies as above described, where the agent is used at sufficiently high temperatures, and in small quantities sufficient only to devulcanize or reclaim the rubber mass and to obtain a desirable sheeting consistency without solution of the rubber in the agent. The invention includes further such devulcanizing treatment in an aqueous solution, and also in an aqueous solution of caustic alkali for the destruction of cellulose fiber when the latter is present in the scrap goods being reclaimed.

While digestion of vulcanized rubber scrap in water or in caustic soda solution alone will impart some plasticity to the vulcanized rubber, it is however necessary in commercial practice to introduce suitable softening materials or reclaiming agents for the purpose of speeding up the softening and devulcanizing operation. These agents shorten the digestion period and reduce the mechanical working required. Also while digestion with the reclaiming agent may take place in the absence of a solution, e. g. by treating in the presence of steam as above suggested, matters are facilitated by operating in the solution, it having been found that the softening and devulcanization usually proceeds much faster, as a result of better heat conductivity.

We have found the procedure employing small quantities of reclaiming agent in conjunction with operation in aqueous solution or in steam, to be superior to employing the Edeleanu extract or other defined agent alone and in quantity sufficient to dissolve the rubber. We employ in usual practice about 3 to 6% of Edeleanu extract calculated on the weight of the rubber, although the amount may vary somewhat between approximately 1% and 10% according to the stock being treated and other incidental conditions. In fact the upper limit might be increased somewhat so long as the amount is kept within limits to avoid rendering the resultant mass too tacky. As to the aqueous solution, a quantity running somewhere around four times the quantity of the rubber may be used. The amount of solution is relatively unimportant and wide ranges are permissible. It is always desirable to use sufficient water to allow of ready agitation and good heat conductivity. The amount of water that will be used depends on the type of autoclave employed and the physical state of the rubber. The more bulky the rubber, the greater the relative amount of water required. The entire charge is treated in a suitable digester at a temperature sufficiently elevated to promote reclamation or devulcanization, that is at a temperature above 325° F., and the treatment is conducted for a period sufficiently long to accomplish the desired results. The temperature is required to be elevated and carried above approximately 325° F. for the reason that this represents the temperature at which only incipient devulcanization of the rubber usually occurs. Normally a temperature around 340° F. or somewhat higher will be employed.

As a specific example of a procedure suitable for reclaiming rubber by this process, a quantity of rubber scrap was obtained by comminuting a number of old automobile tire casings on a rubber mill. This scrap contained about 80% rubber compound and 20% cotton fiber. Said ground scrap was introduced into a digester in the form of a heated autoclave provided with a constantly operated agitator. With each 500 parts of rubber scrap there were supplied 2000 parts of an 8% caustic soda solution, and 50 parts of Edeleanu extract. The Edeleanu extract was obtained from the refining of a kerosene distillate from a California stock by extraction with liquid sulfur dioxide according to the well known Edeleanu process above described. The charge was heated to 370° F. and was held at this temperature for about 20 hours with constant agitation.

The rubber was then removed, washed well and dried. It had a spongy appearance, was free from particles of fabric, and was quite plastic. As a test of its quality, the time required for milling a sample of the reclaimed rubber on the rolls of a rubber mill to a definite degree of plasticity was taken as a measure in comparison with the time for milling a reclaimed rubber obtained in the same way using the common pine tar softening agent. In the case of the rubber obtained with the Edeleanu extract the time was 7 minutes as compared with the time of 8 minutes for milling a rubber reclaimed with pine tar. The shorter milling time indicates greater or at least comparable reclaiming activity of the agent used.

As to the reclaiming treatment given in the example above, this may be taken as representative of fairly average temperature conditions, although the rubber stock was of such a character that it presented considerable difficulty in the reclaiming, and required a relatively large amount of extract. An average amount of extract would be about 25 parts to 500 parts of rubber scrap. Time and temperature are subject to considerable variation in practice, both being governed by the character of the scrap rubber and by economic considerations. Thus in some plants where a high steam pressure is available, shorter periods of time will be sufficient due to better heat conditions, whereas where low steam pressure must be employed a longer period, such as the twenty hours given in the above example, will be necessary. These varying conditions are however merely relative, and are readily determinable whatever the circumstances.

As a further test the rubber reclaimed with

Edeleanu extract by the present method was compounded and vulcanized in the usual way and compared with a rubber obtained using pine tar, and also with rubber obtained using only caustic soda. In each case the rubber was compounded as follows:

|  | Parts |
|---|---|
| Reclaimed rubber | 25 |
| Raw rubber | 75 |
| Zinc oxide | 10 |
| Sulfur | 3 |
| Commercial accelerators | 1.25 |
| Stearic acid | 1 |

Each of the three rubbers mentioned was subjected to the following accelerated aging tests to determine tensile strengths:

| Test | Reclaiming agent used | Tensile strength—lbs. per sq. in. | | |
|---|---|---|---|---|
| | | Un-aged | After aging at 158° F. | |
| | | | Six days | Twelve days |
| 1 | None | 2800 | 1600 | 800 |
| 2 | Pine tar | 2800 | 1600 | 800 |
| 3 | Edeleanu extract from kerosene distillate | 3400 | 2800 | 1400 |

As previously indicated where no fabric is present in the scrap rubber it is unnecessary to use caustic alkali. It is obvious that potassium hydroxide may be employed as well as sodium hydroxide. In some instances it may be desirable to substitute sulfuric acid for the alkali or to use some other agent having a sufficiently high hydrolyzing action upon the cellulose. Also as previously indicated where no cellulose fiber is present it is not absolutely necessary to use any solution at all, although in such a case it probably will always be preferable to operate in an inert atmosphere such as steam to avoid the oxidizing effects which would result from operation in air. In this latter case, mere agitation, which would be sufficient where using solution with the extract, will usually have to be replaced by a more intensive mechanical working such as would be supplied by a mechanical blade mixer or other machine adapted to work the rubber to the desired condition, e. g., a rubber mill. However in any event the small amounts of Edeleanu extract, that is amounts insufficient to liquefy the product as previously indicated, will be those employed.

Where the scrap goods contains cellulose fiber and it is necessary to accomplish the destruction of the fiber, the goods must be more or less comminuted before digestion. Where such fiber is no objection in the product for which the reclaimed goods is to be used, for example for shoe soles, the alkali or acid treatment will be unnecessary. Where the scrap rubber contains no fiber, it may be unnecessary to comminute the same so long as the subdivision is suitable to insure sufficiently rapid reclamation.

In any case the reclaimed product obtained from the process is a solid of sufficiently soft, loose texture to permit it to be easily washed and dried. At the same time it is capable of being readily sheeted or moulded and it may be revulcanized to form new articles.

The Edeleanu extract or other reclaiming agent may be allowed to remain in the product, or it may be wholly or partially removed prior to revulcanization by distillation with air or steam, or by extraction with a solvent such as acetone or an anhydrous alcohol, or otherwise. However, if the reclaiming agent or an appreciable portion thereof be allowed to remain in the article to be revulcanized, it will be important to insure that revulcanization take place below approximately 325° F. to avoid any material tendency to retard vulcanization or to cause devulcanization which impends as 325° F. is approached. But where the amount of extract remaining in the rubber is extremely small, no difficulty will be encountered in retardation of vulcanization even though 325° F. be somewhat exceeded. In fact, the presence of small amounts of the agent possibly is of benefit in helping the reclaimed rubber to retain its plasticity. Aside from this restriction, new goods made up from the reclaimed rubber can be revulcanized in the usual fashion, and also at usual temperature since such vulcanization temperatures for both virgin rubber and reclaimed rubber are below 325° F.

The sludge oils previously mentioned as being useful in place of Edeleanu extract are recovered from acid sludges which are obtained from the sulfuric acid treatment of various petroleum fractions, for example kerosene, such as a California kerosene. By hydrolyzing the acid sludge as with steam the sludge separates into two layers, one of which is a solution of sulfuric acid and the other of which is known as "sludge oil" and is the acid sludge oil here designated. The treatment of rubber goods with this agent is essentially the same as with Edeleanu extract as above described, and the reclaimed rubber has the same general characteristics.

Instead of Edeleanu extracts and sludge oils, other petroleum fractions, especially where soluble in liquid sulfur dioxide, may be employed. Desirable Edeleanu extracts, sludge oils, and other petroleum fractions soluble in sulfur dioxide are particularly those obtained from kerosene distillates such as kerosene distillates from California petroleum stock. But $SO_2$ soluble fractions both from lighter distillates such as gasoline and from heavier distillates such as light and heavy lubricating oils may be used. In general the extracts and fractions from the lighter petroleum distillates such as gasoline and kerosene are somewhat more efficient than those from the heavier distillates. Those from kerosene appear to be most desirable for all practical purposes, but those obtained from the other distillates are nevertheless valuable. Other suitable agents are fractions of other oils such as shale oils, tar oil, and coal tars and oils when such fractions correspond generally in character to Edeleanu extracts, that is when they contain unsaturated and aromatic hydrocarbons and nitrogen and sulfur bodies and/or are soluble in liquid sulfur dioxide.

It is to be understood that wherever the term "Edeleanu extract" is used, it is intended to cover any fraction distilled from said extract and having the required properties. For example, in some instances it may be desirable to use an agent more volatile than the original Edeleanu extract, and such agent may be readily obtained by distillation of the extract. Thus a fraction of Edeleanu extract distilled over between 400° F. and 550° F. where the extract is obtained from a California kerosene stock is very desirable.

Similarly wherever the term "sludge oil" is employed, it is intended that the expression shall include any sludge oil fraction having the necessary characteristics as above indicated. This is particularly true where the sludge oil itself is too heavy to be suitable for the required purpose. In such case a lighter desirable fraction can be obtained by distillation.

We claim:

1. A method for reclaiming vulcanized rubber comprising contacting the rubber with a petroleum fraction largely soluble in liquid sulfur dioxide, said fraction being used in an amount insufficient to liquefy the rubber but sufficient to devulcanize the same and carrying on the treatment at an elevated temperature to promote reclamation and for a time to effect the reclamation.

2. A method of reclaiming rubber comprising contacting scrap rubber with an Edeleanu extract, such extract being employed in an amount sufficient only to reclaim the rubber without liquefying the same, and carrying on the operation at a temperature sufficiently elevated and for a time to effect the reclamation.

3. A method for reclaiming rubber comprising contacting scrap rubber with a sludge oil, such oil being employed in an amount sufficient only to reclaim the rubber without liquefying the same, and carrying on the treatment at a temperature sufficiently elevated and for a time to effect the reclamation.

4. A method for reclaiming rubber comprising contacting scrap rubber with a petroleum fraction largely soluble in liquid sulfur dioxide, and conducting the operation at a temperature above approximately 325° F. for a time sufficient to effect reclamation, said petroleum fraction being employed in an amount between approximately 1% and approximately 10% of the rubber.

5. A method for reclaiming rubber comprising contacting scrap rubber in the presence of between 3 and 6% of a petroleum fraction largely soluble in liquid sulfur dioxide at a temperature suitably high and for a time sufficient to soften the rubber and effect reclamation.

6. A method according to claim 1 wherein the rubber is maintained in contact with water during treatment.

7. A method according to claim 1 wherein the rubber during treatment is disposed in an atmosphere of steam.

8. A method for reclaiming rubber comprising contacting scrap rubber with Edeleanu extract, such extract being employed in an amount sufficient only to devulcanize the rubber without liquefying the same, and carrying on the treatment in a body of water at an elevated temperature sufficient to promote devulcanization and for a time to effect devulcanization.

9. A method for reclaiming vulcanized rubber comprising mechanically working the rubber with a petroleum fraction largely soluble in liquid sulfur dioxide, said fraction being used in an amount insufficient to liquefy the rubber but sufficient to devulcanize the same, and conducting the operation in an inert gaseous atmosphere at an elevated temperature capable of effecting reclamation and for a time sufficient to effect the reclamation.

Signed at Wilmington, in the county of Los Angeles and State of California, this 14th day of April, A. D. 1931.

ROBERT A. DUNHAM.
MARCELLUS T. FLAXMAN.